(12) United States Patent
Balasubramaniam et al.

(10) Patent No.: US 11,025,736 B2
(45) Date of Patent: Jun. 1, 2021

(54) DEVELOP AND MULTIPLY YOUR NETWORK AT EVENTS

(71) Applicant: Microsoft Technology Licensing, LLC, Redmond, WA (US)

(72) Inventors: Sezhiyan Balasubramaniam, Fremont, CA (US); Vincent Lloyd Harding, Gilroy, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 15/380,746

(22) Filed: Dec. 15, 2016

(65) Prior Publication Data

US 2017/0257448 A1 Sep. 7, 2017

Related U.S. Application Data

(60) Provisional application No. 62/302,554, filed on Mar. 2, 2016.

(51) Int. Cl.
*G06Q 50/00* (2012.01)
*H04L 29/08* (2006.01)

(52) U.S. Cl.
CPC ............ *H04L 67/26* (2013.01); *G06Q 50/01* (2013.01); *H04L 67/18* (2013.01); *H04L 67/22* (2013.01); *H04L 67/306* (2013.01)

(58) Field of Classification Search
None
See application file for complete search history.

(56) References Cited

U.S. PATENT DOCUMENTS

| 2011/0320536 | A1* | 12/2011 | Lobb | G06Q 50/01 709/205 |
| 2014/0129631 | A1* | 5/2014 | Jayaram | G06Q 50/01 709/204 |
| 2014/0180943 | A1* | 6/2014 | Priddy, Jr. | G06Q 50/01 705/319 |
| 2014/0188899 | A1* | 7/2014 | Whitnah | G06F 17/30646 707/749 |
| 2014/0343994 | A1* | 11/2014 | Graff | G06Q 10/1095 705/7.19 |

(Continued)

*Primary Examiner* — Aftab N. Khan
(74) *Attorney, Agent, or Firm* — Schwegman Lundberg & Woessner, P.A.

(57) ABSTRACT

A system, a machine-readable storage medium storing instructions, and a computer-implemented method as described herein are directed to an Event Network Engine. The Event Network Engine determines a presence of a target member account of a social networking service within a threshold distance from a physical location during an event time range. The Event Network Engine determines a presence of a second member account of the social networking service within the threshold distance from the physical location during the event time range is concurrent with the presence of the target member account. The Event Network Engine determines, based on social network member data, a relationship between the target member account and the second member account exists in the social networking service. Based on the relationship, the Event Network Engine causes a display of a notification for display on a client device associated with the target member account.

20 Claims, 7 Drawing Sheets

(56) References Cited

U.S. PATENT DOCUMENTS

| | | | |
|---|---|---|---|
| 2015/0046356 A1* | 2/2015 | Millmore | G06Q 10/1053 |
| | | | 705/321 |
| 2015/0127565 A1* | 5/2015 | Chevalier | G06Q 10/00 |
| | | | 705/319 |
| 2015/0234939 A1* | 8/2015 | Aharony | G06F 17/3087 |
| | | | 707/737 |
| 2015/0245168 A1* | 8/2015 | Martin | H04L 67/18 |
| | | | 715/751 |
| 2016/0005003 A1* | 1/2016 | Norris | G06Q 10/10 |
| | | | 705/7.19 |
| 2016/0260064 A1* | 9/2016 | Ahmed | H04L 67/306 |
| 2017/0235766 A1* | 8/2017 | Mawji | G06F 16/248 |
| | | | 707/722 |
| 2017/0323270 A1* | 11/2017 | Gibbs | G01S 19/13 |

* cited by examiner

DEVELOP AND MULTIPLY YOUR NETWORK AT EVENTS

CROSS-REFERENCE TO RELATED APPLICATION

This application claims the benefit of priority to U.S. Provisional Patent Application entitled "Nurture & Multiply Your Network at Events," Ser. No. 62/302,554, filed Mar. 2, 2016, which is hereby incorporated herein by reference in its entirety.

TECHNICAL FIELD

The present disclosure generally relates to data processing systems. More specifically, the present disclosure relates to methods, systems and computer program products for generating and sending notifications to client devices associated with respective attendees of an event.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

The present disclosure describes methods and systems for generating and sending notifications to a member account(s) of a social network (also referred herein as "professional social network," "social networking service") during attendance of an event. In the following description, for purposes of explanation, numerous specific details are set forth in order to provide a thorough understanding of the various aspects of different embodiments described herein. It will be evident, however, to one skilled in the art, that one or more embodiments may be practiced without all of the specific details described herein.

A system, a machine-readable storage medium storing instructions, and a computer-implemented method as described herein are directed to an Event Network Engine. The Event Network Engine determines a presence of a target member account of a social networking service within a threshold distance from a physical location during an event time range. The Event Network Engine determines a presence of a second member account of the social networking service within the threshold distance from the physical location during the event time range is concurrent with the presence of the target member account. The Event Network Engine determines, based on social network member data, a relationship between the target member account and the second member account exists in the social networking service. Based on the relationship, the Event Network Engine causes a display of a notification for display on a client device associated with the target member account.

In various embodiments, the Event Network Engine receives an identifier of a target member account of a social networking service and multiple identifiers of a plurality of respective member accounts in the social networking service. The identifiers trigger a registration action for each member account that indicates attendance at an event. The users represented by each member account are therefore planning on being an attendee of the same event. The identifiers further indicates permission from the member accounts to access member profile data (e.g. education, work experience, skills, endorsements, social network connections) and member account historical browsing data in the social networking service.

For each member account, the Event Network Engine generates a unique uniform resource locator (URL) that is associated with the event and that respective member account. The URL is sent from the Event Network Engine to a client device associated with each member account for display on the client device. In some embodiments, the client device can be a wristband client device provided to event attendees.

The Event Network Engine receives an indication that the unique URL for the target member account has been selected at the client device associated with the target member account. Such selection of the unique URL represents that the user represented by the target member account is physically checking into the event in order to confirm actual attendance of the event. The Event Network Engine further receives an indication that the unique URLs for the other member accounts have also been selected at respective, different client devices associated with the other member accounts.

Based on the receipt of the selections of the unique URLs from the various member accounts, the Event Network Engine generates an event connections graph specific to each member account. For example, a first event connections graph is generated for the target member account and a second event connections graph is generated for another member account that represents a user also attending the event. The first event connections graph is based on the social network connections of the target member account that has selected their unique URL and are therefore also attending the event. Therefore, the first event connections graph, when displayed on the client device associated with the target member account, provides a graphical illustration of the target member account's $1^{st}$-degree, $2^{nd}$-degree, $3^{rd}$-degree social network connections who are also concurrently, physically present at the event.

The first event connections graph comprises a graphical display wherein $1^{st}$-degree, $2^{nd}$-degree, $3^{rd}$-degree social network connections of the target member account present at the event are represented by a respective graphical icon that provides an identity of the particular social network connection. Further, a $1^{st}$-degree social network connection may be based on an icon template that is different than an icon template for a $2^{nd}$-degree social network connection and an icon template for a 3rd-degree social network connection with respect to at least one of: shape, color, design, size.

The Event Network Engine further generates the first event connections graph to include a selectable functionality for sending and receiving messages between the target member account and a member account for any social network connection represented in the first event connections graph. For example, the Event Network Engine receives a selection of a first icon for a $1^{st}$-degree social network connection displayed in the first event connections graph on the client device associated with the target member account. Based on the selection of the first icon, a messaging functionality is triggered that provides for messaging between the target member account and the member account of the selected $1^{st}$-degree social network connection.

The Event Network Engine further generates one or more notifications to be sent to the target member account for display on the client device associated with the target member account. For example, the Event Network Engine accesses the target member account's historical browsing data (such as webpage views, link selections, product purchases, shares, likes, ratings) and member profile data and determines that a second member account with one or more attributes (such as member profile attributes) that correspond with (or match) a portion of the target member account's historical browsing data is currently present at the event. In another embodiment, the Event Network Engine determines that a second member account with one or more member profile attributes that correspond with (or match) a portion of the target member account's member profile data is currently present at the event. Based on the second member account's attendance at the event, the Event Network Engine generates a notification for display on the client device associated with the target member account and for display on a client device associated with the second member account. For example, according to an exemplary embodiments, if both the target member account and the second member account are wearing wristband client devices that are solely activated for use at the event, both the target member account and the second member account receive a notification representative of each other's presence at the event.

As described in various embodiments, the operation of the Event Network Engine is completely configurable and customizable by a user through a user-supplied configuration file such as a JavaScript Object Notation (JSON), eXtensible Markup Language (XML) tile, etc.

For example, each module in the Event Network Engine may have text associated with it in a configuration file(s) that describes how the module is configured, the inputs to the module, the operations to be performed by the module on the inputs, the outputs from the module, and so on. Accordingly, the user may rearrange the way these modules are connected together as well as the encoded rules that the various modules use to perform various operations. Thus, the Event Network Engine may be configured in a modular and reusable fashion.

It is understood that various embodiments of the Event Network Engine further include encoded instructions that comprise operations to generate a user interface(s) and various user interface elements. The user interface and the various user interface elements can be displayed to be representative of any of the operations, data, notifications, social network connections, member profile attributes as described herein. In addition, the user interface and various user interface elements are generated by the Event Network Engine for display on a computing device, a server computing device, a mobile computing device, a wearable client device, etc.

Figure 1:
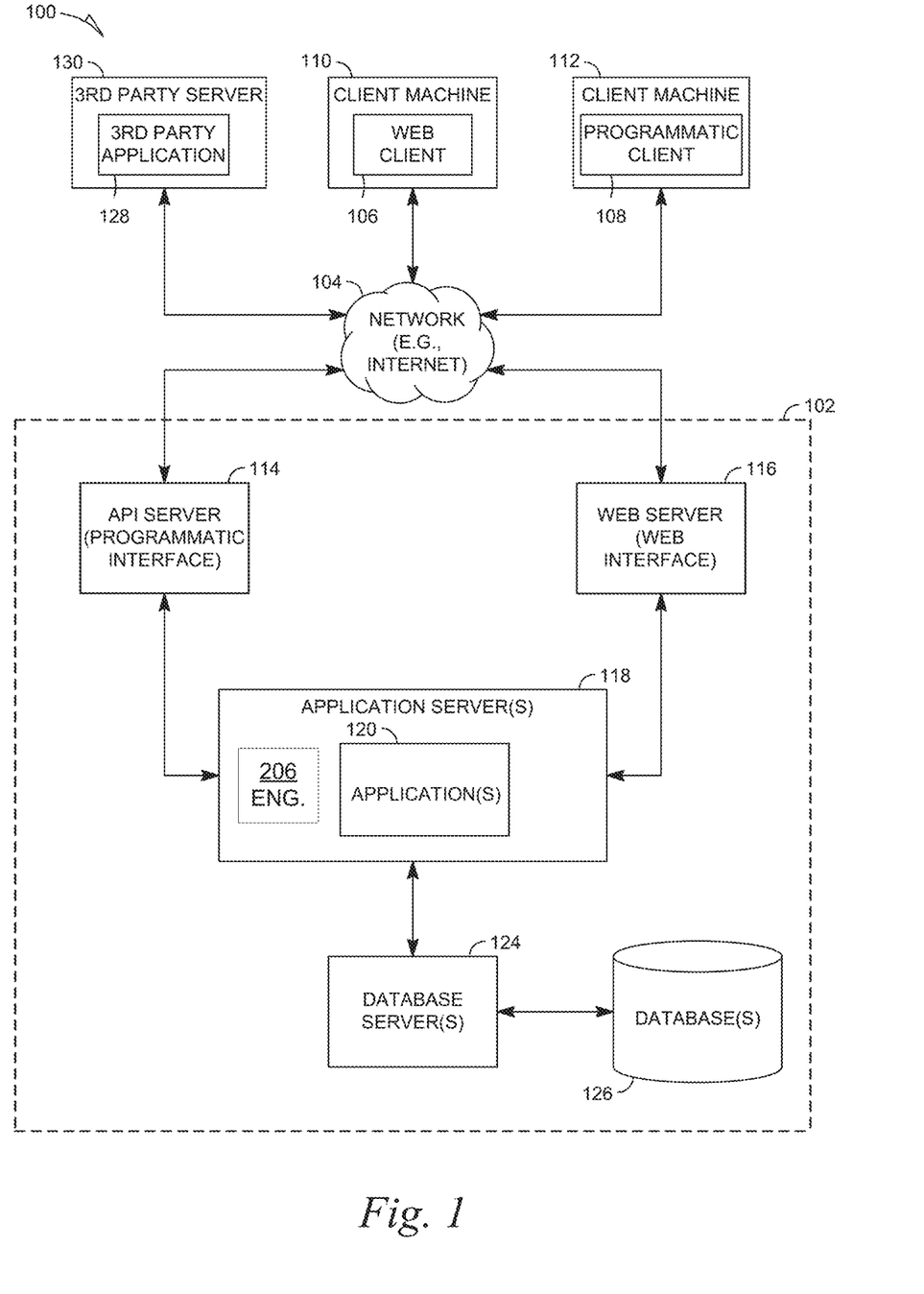
FIG. 1 is a block diagram illustrating a client-server system, in accordance with some examples of the present disclosure.

Turning now to FIG. 1, FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a professional social network.

Figure 2:
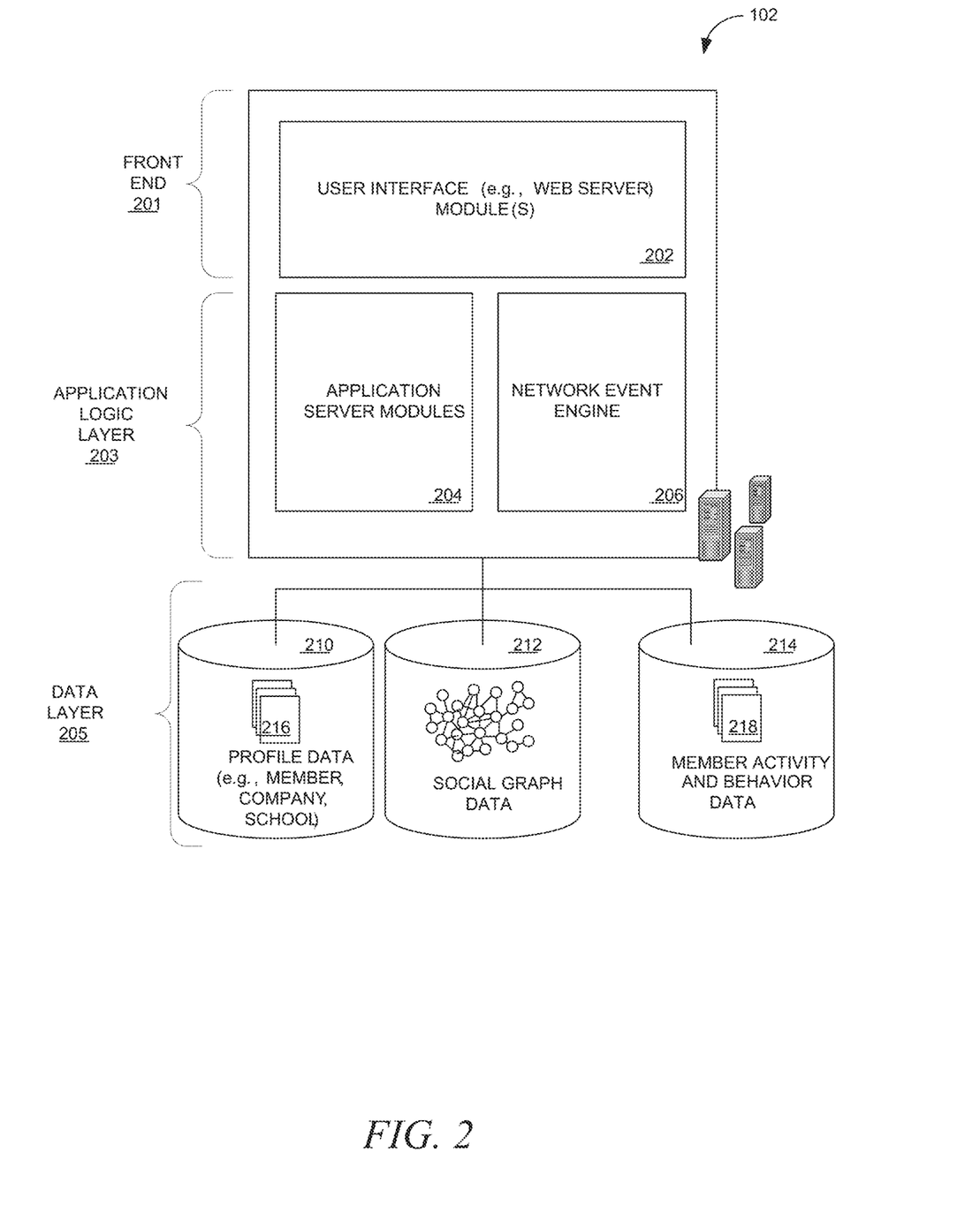
FIG. 2 is a block diagram showing functional components of a professional social network within a networked system, in accordance with some examples of the present disclosure

FIG. 2 is a block diagram showing functional components of a professional social network within the networked system 102, in accordance with an example embodiment.

As shown in FIG. 2, the professional social network may be based on a three-tiered architecture, consisting of a front-end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a professional social network, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a professional social network is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile attribute data as well as profile attribute data for various organizations. The profile data 216 also includes attribute data of one or more job postings (or job listings). Consistent with some embodiments, when a person initially registers to become a member of the professional social network, the person will be prompted to provide some profile attribute data such as, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or a seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

As members interact with the various applications, services and content made available via the professional social network, the members' behaviour (e.g., content viewed, links or member-interest buttons selected, etc.) may be monitored and information 218 concerning the member's activities and behaviour may be stored, for example, as indicated in FIG. 2, by the database 214. This information 218 may be used to classify the member as being in various categories and may be further considered as an attribute of the member. For example, if the member performs frequent searches, views and applies to job posting, thereby exhibiting behaviour indicating that the member is a likely job seeker, this information 218 can be used to classify the member as being a job seeker and further be used to predict whether the member will apply to other similar job postings. This classification can then be used as a member profile attribute for purposes of enabling others to target the member for receiving messages, status updates and/or a list of ranked premium and recommending job postings.

In some embodiments, the professional social network provides an application programming interface (API) module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing devices) having a mobile operating system.

The data in the data layer 205 may be accessed, used, and adjusted by the Event Network Engine 206 as will be described in more detail below in conjunction with FIGS. 3-6. Although the Event Network Engine 206 is referred to herein as being used in the context of a professional social network, it is contemplated that it may also be employed in the context of any website or online services, including, but not limited to, content sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure. It is understood that the Event Network Engine 206 can be executed by one or more application servers 118 as illustrated in FIG. 1.

Figure 3:
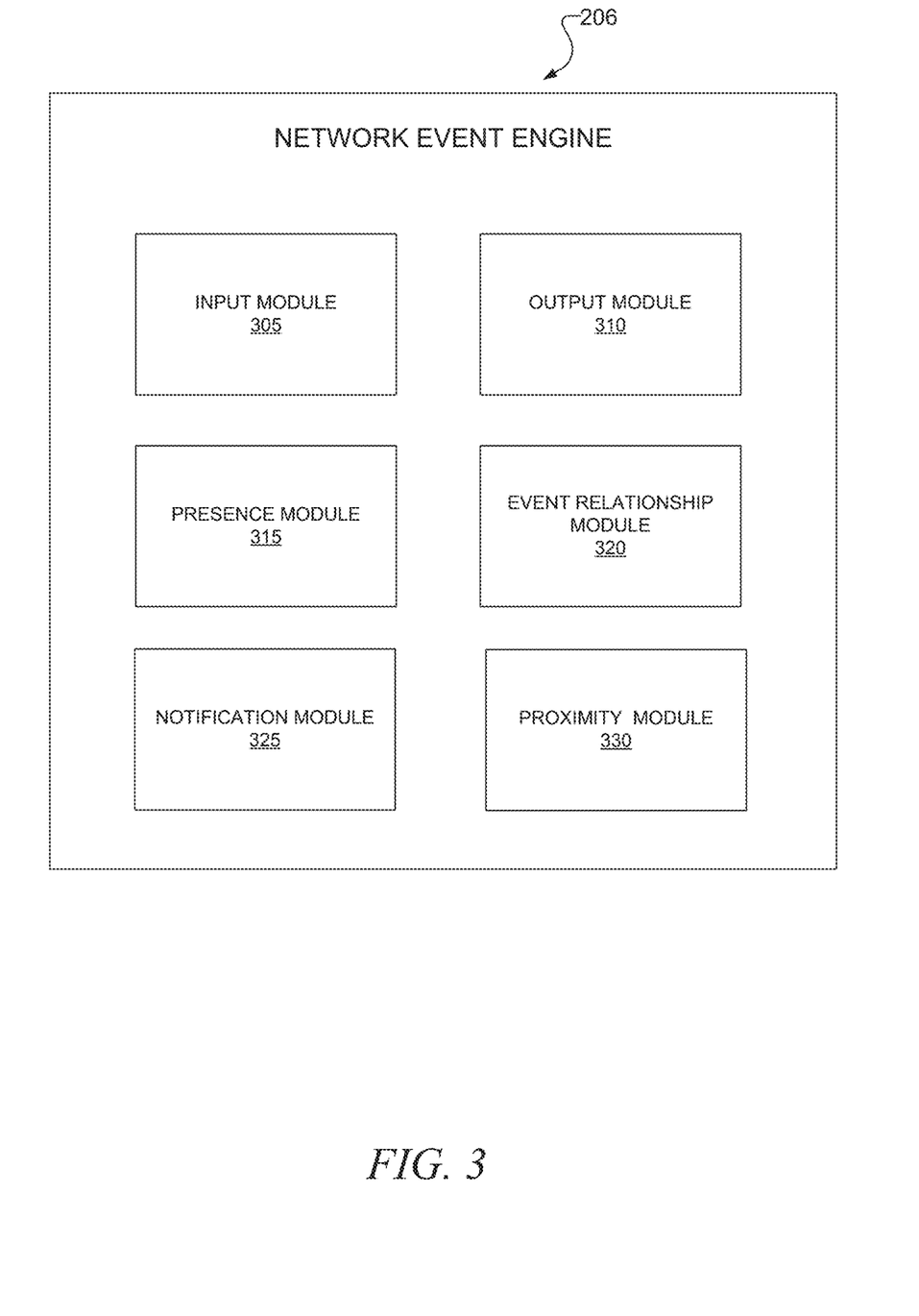
FIG. 3 is a block diagram showing example components of an Event Network Engine, according to some examples of the present disclosure

FIG. 3 is a block diagram showing example components of an Event Network Engine 206, according to some embodiments.

The input module 305 is a hardware-implemented module that controls, manages and stores information related to any inputs from one or more components of system 102 as illustrated in FIG. 1 and FIG. 2. In various embodiments, the inputs include at least one of a received registration for an event and a selection of a URL that acts as confirmation of attendance at the event.

The output module 310 is a hardware-implemented module that controls, manages and stores information related to which sends any outputs to one or more components of system 100 of FIG. 1 (e.g., one or more client devices 110, 112, third party server 130, etc.). In some embodiments, the output is a notification related to an event relationship between one or more member accounts that correspond to attendees of the event. An output is also a particular event connections graph for each respective member account that correspond to attendees of the event.

The presence module 315 is a hardware implemented module which manages, controls, stores, and accesses information related to determining when a plurality of member accounts have confirmed attendance at an event within a threshold amount of time, such as an event duration time range.

The event relationship module 320 is a hardware-implemented module which manages, controls, stores, and accesses information related to determining similarities between member accounts that represent event attendees that are concurrently present at the event. For example, the event relationship module 320 determines similarities and common features between a first member account's social network profile attributes and a second member account's social network browsing behaviors to identify an event relationship between the first and second member account. It is understood that an event relationship can be determined to exist between any number of member accounts. In addition, an event relationship can exist between two or more member accounts. The event relationship module 320 further determines similarities and common attributes present in member profile data of two or more member accounts.

The notification module 325 is a hardware-implemented module which manages, controls, stores, and accesses information related to generating notifications to be sent to one or more client devices. For example, the notification module 325 generates a notification to be sent for display on two client devices, where the client devices correspond to event attendees who have an event relationship via their respective member accounts in the social network service. The notification module 325 further generates a notification to be sent for display on a physical stand-alone display screen.

The proximity module 330 is a hardware-implemented module which manages, controls, stores, and accesses information related to sending notifications to client devices based on detected proximity of the client devices. For example, the proximity module 330 detects that client devices associated with event attendees that have respective member accounts—between which an event relationship exists—are within a threshold proximate distance from each other. Based on detecting the client devices are within the threshold proximate distance, the proximity module 330 initiates sending notifications to the client devices.

Figure 4:
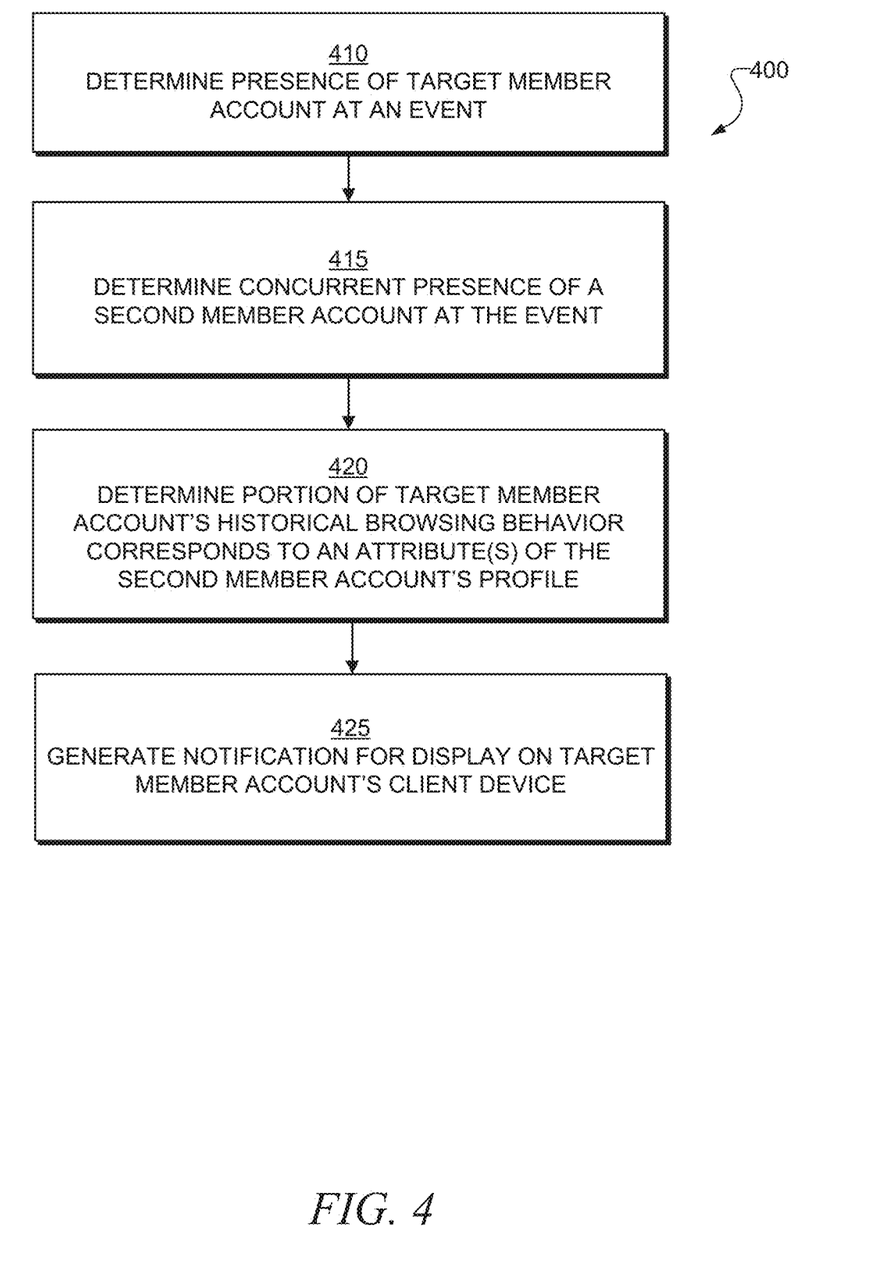
FIG. 4 is a flowchart illustrating a method of generating a notification for a target member account, according to embodiments described herein.

FIG. 4 is a flowchart illustrating a method 400 of generating a notification for a target member account, according to embodiments described herein.

At operation 410, the Event Network Engine 206 determines presence of a target member account of a social networking service within a threshold distance from a physical location during an event time range.

For example, the Event Network Engine 206 receives a request for the target member account to register for an event that occurs at a physical location during an event time range. For each member account that requests registration, the Event Network Engine 206 generates a URL unique for the respective member account and sends the URL to the respective member account. The Event Network Engine 206 receives an indication that the target member account's unique URL has been selected on a client device associated with the target member account. In one embodiment, the client device can be a flexible wrist band with a dedicated display screen for displaying data generated by and received from the Event Network Engine 206.

An event is a physical event in that it will take place at a geographical location and will occur during an event time range. The Event Network Engine 206 receives an indication that the target member account's unique URL has been selected on a client device associated with the target member account. The Event Network Engine 206 determines the indication of URL selection is an attendance confirmation from the target member account. The attendance confirmation includes geocode data representative of the event's geographical location and time data representing that the URL was selected at the target member account's client device during the event time range. In one embodiment, the client device can be a flexible wrist band with a dedicated display screen for displaying data generated by and received from the Event Network Engine 206.

At operation 415, the Event Network Engine 206 determines presence of a second member account of the social networking service within the threshold distance from the physical location during the event time range is concurrent with the presence of the target member account. The Event Network Engine 206 receives an indication that the second member account's unique URL has been selected. The Event Network Engine 206 determines the indication of second member account's unique URL selection is an attendance confirmation from the second member account. The attendance confirmation—as represented by unique URL selection at a client device of a respective member account—includes geocode data (such as GPS data) representative of the event's geographical location and time data representing that the URL was selected at the second member account's client device during the event time range.

Based on the time data for both the target member account and the second member account, the Event Network Engine 206 determines that both the target member account and the second member account are concurrently attending the event. For example, the Event Network Engine 206 determines such concurrent attendance based on the respective URL selections of the target member account and the second member account occurring within a threshold amount of time, such both URLs being selected within 60 minutes of each other.

At operation 420 the Event Network Engine 206 determines a portion of the target member account's historical browsing behavior in the social networking service corresponds to at least one attribute of a member profile of the second member account in the social networking service.

The Event Network Engine 206 provides for real-time notifications sent to client device's of attendees who have member accounts in the social network service. Such notifications are based on context of the various member account profile attributes and member account browsing behaviours in the social network service.

In one example, the Event Network Engine 206 identifies a plurality of endorsements on the profile of the second member account. The profile of the second member account has a Skill tag and other member accounts have endorsed the Skill tag of the second member account. A Skill tag is a portion of text that represents a professional skill. The Event Network Engine 206 identifies that a portion of the endorsements were received from respective member accounts that are currently employed at Company A.

The Event Network Engine 206 accesses historical browsing behaviour of the target member account that occurred in the social network service. The Event Network Engine 206 identified one or more browsing behaviours of the target member account that are related to Company A. For example, the Event Network Engine 206 identifies the target member account viewed a threshold amount of job opening descriptions (such as job postings) at Company A that are viewable within the social network service. For example, the Event Network Engine 206 identifies the target member applied to a particular job, via the social network service, by responding to a job opening description at Company A viewable within the social network service. For example, the Event Network Engine 206 identifies the target member account viewed a plurality of articles posted in the social network service about Company A.

At operation 425, based on the target member account's historical browsing behavior in the social networking service corresponding to at least one attribute of the member profile of the second member account, the Event Network Engine 206 generates a notification for display on a client device of the target member account.

For example, based on all or a portion of these browsing behaviours related to Company A, the Event Network Engine 206 infers that the target member account has an interest in Company A. Given that the second member account has received Skill endorsements from member accounts of Company A employees, the Event Network Engine 206 creates an event relationship between the target member account and the second member account, regardless if there is no social network connection between the target member account and the second member account.

The Event Network Engine 206 generates and sends notifications based on the event relationship to client devices of the target member account and the second member account. For example, the Event Network Engine 206 determines the client devices are currently within a threshold distance from each other (such as both people are about to be walking by each other), and the Event Network Engine 206 sends notifications to the respective client devices. The notifications can include a description of the event relationship between the target member account and the second member account, a displayed portion of their respective social network profiles and a list of any common social network connections. Such notifications have the intended purpose of initiating introductions between people attending the event.

In another embodiment, the Network Event Engine accesses the target member account's historical browsing behaviour and identifies a search query submitted within the social networking service by the target member account. The search query includes text describing Company A. The Network Event Engine determines that Company A is present in the member profile data of the second member account as an employer attribute. For example, in a "Work Experience" section of a social network profile of the second member account, Company A is listed as a previous employer. The Network Event Engine determines an event relationship exists between the target member account and the second member account based in part on the search query about Company A and the second member account's previous employer.

Figure 5:
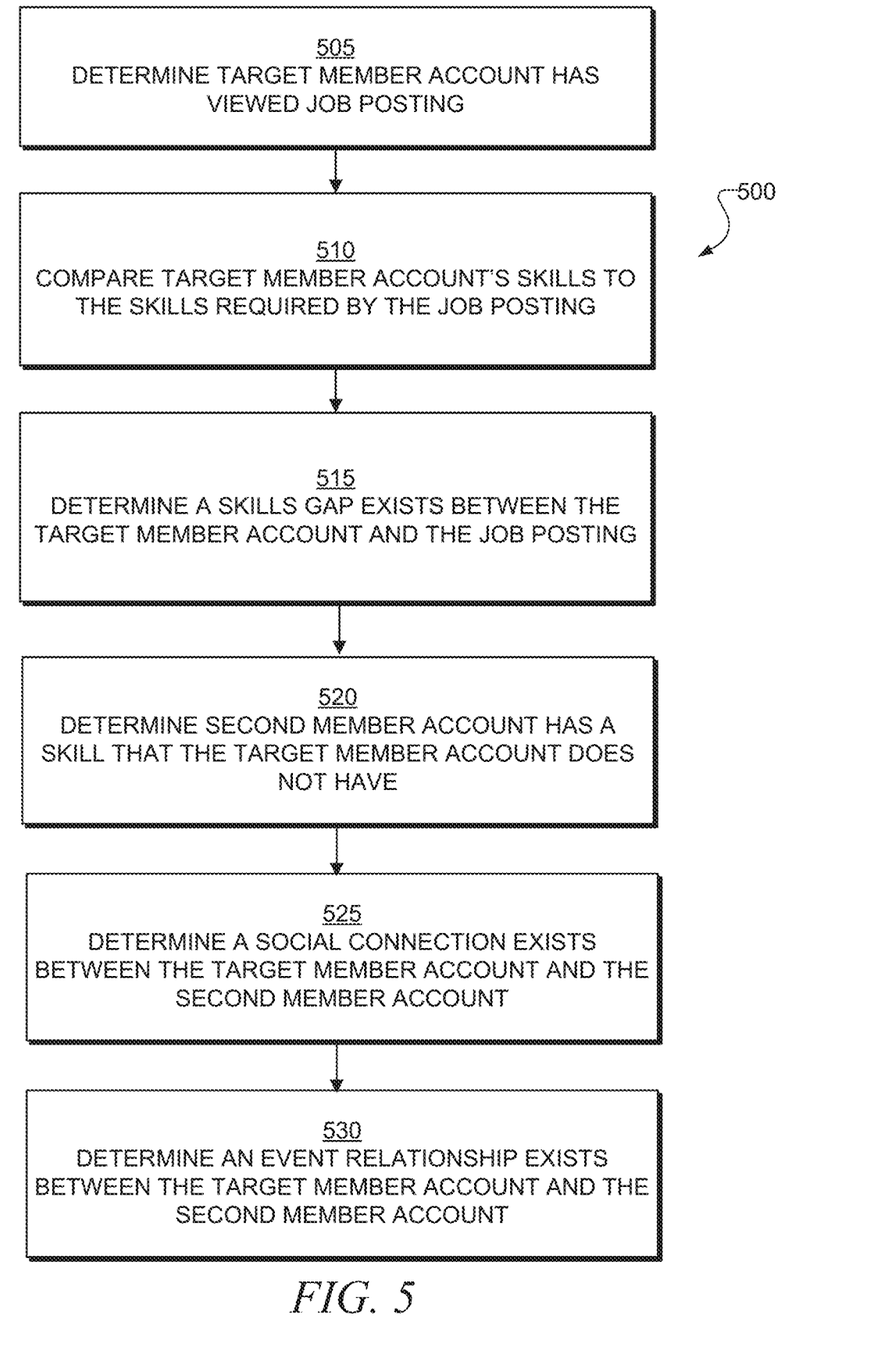
FIG. 5 is a flowchart illustrating a method of identifying an event relationship based in part on a skills gap, according to embodiments described herein.

FIG. 5 is a flowchart illustrating a method 500 of identifying an event relationship based in part on a skills gap, according to embodiments described herein.

At operation 505, the Network Event Engine 206 identifying an access by the target account member of a job posting in the social networking service. For example, the Network Event Engine 206 accesses historical browsing behaviour data of the target member account and retrieves data indicating the target member account viewed a job posting viewable within the social networking service a threshold number of times.

At operation 510, the Network Event Engine 206 compares a first set of professional skills descriptor tags applied to the job posting to a second set of professional skills description tags. For example, the job posting was submitted to the social networking service by an employer account. The employer account selected one or more professional skills description tags selected by the target member account for inclusion in member profile data to be applied to and displayed with the job posting. A professional skills description tag includes text descriptive of a professional skills, such as: "software design," "data analysis," "legal writing," "pro-bona advocacy," "public speaking," etc. It is understood that the social networking service includes a library of selectable professional skills description tags and further includes a functionality for a member account to create a customized professional skills description tag(s). The target member account's member profile data also includes professional skills description tags the target member account selected to be included in the target member account's member profile data and for display with the target member account's profile. The Network Event Engine 206 compares the professional skills description tags of the job posting and the target member account's member profile data.

At operation 515, the Network Event Engine 206 identifies a skills gap comprising at least one professional skills descriptor tag from the first set of professional skills descriptor tags not present in the second set of professional skills descriptor tags. For example, The Network Event Engine 206 compares the professional skills description tags of both the job posting and the target member account's member profile data. The Network Event Engine 206 determines that a particular professional skills description tag of the job posting is not present in the target member account's member profile data. Therefore, a skills gap exists between the target member account and the skills required by the job posting.

At operation 520, the Network Event Engine 206 determines the second member account selected a respective professional skills descriptor tag in the skills gap for inclusion in the member profile data of the second member account. For example, the Network Event Engine 206 searches the professional skills description tags in the member profile data of all member accounts that represent users currently physical present at the event. The Network Event Engine 206 identifies the member profile data of second member account as having the particular professional skills description tag that is missing between the target member account and the job posting.

In an exemplary embodiment, Network Event Engine 206 further determines the particular professional skills descriptor tag of the second member account has received a threshold number of endorsements from a plurality of member accounts. If the particular professional skills descriptor tag of the second member account has not received the threshold number of endorsements, the Network Event Engine 206 does not proceed to operations 525-530.

At operation 525, the Network Event Engine 206 determines a social network connection exists between the target member account and the second member account. The Network Event Engine 206 identifies the second member account as a social network connection of the target member account. For example, the second member account can be a $1^{st}$-Degree social connection or a $2^{nd}$-Degree social connection.

At operation 530, the Network Event Engine 206 determines the relationship exists based in part on the respective professional skills descriptor tag in the member profile data of the second member account and the social network connection between the target member account and the second member account. For example, the Network Event Engine 206 determines an event relationship exists between the target member account and the second member account based on the social connection and the member profile data of second member account having the particular professional skills description tag that is missing between the target member account and the job posting.

The Network Event Engine 206 generates a notification for each of the target member account and the second member account in order to increase the probability that the event attendee represented by the target member account may introduce himself to the event attended represented by the second member account. Such an introduction may assist the event attendee represented by the target member account to acquire a new professional skill to eliminate the skills gap. Once the skills gap is eliminated, there is an increased likelihood that the target member account will apply to the job posting via the social network service.

Figure 6:
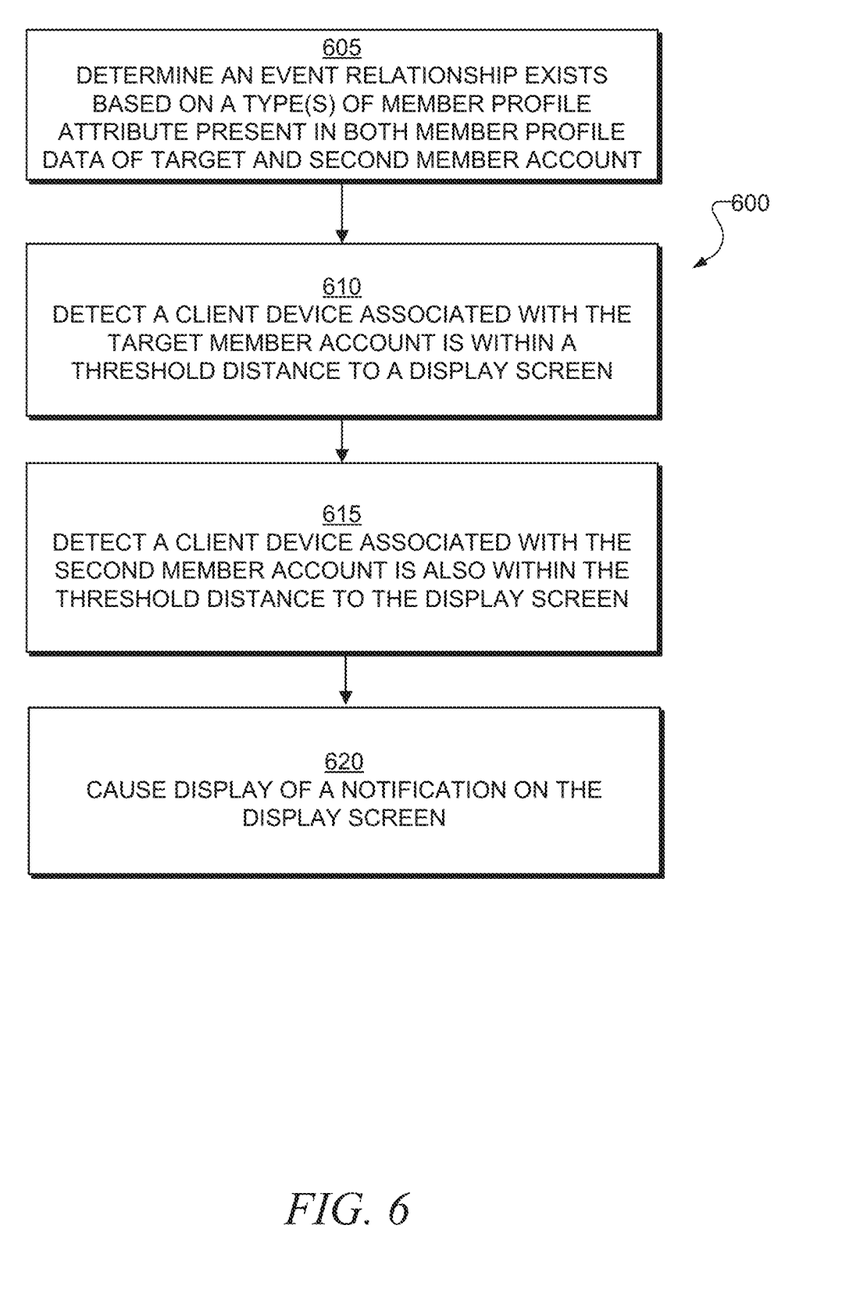
FIG. 6 is a flowchart illustrating a method of displaying notifications on a display screen proximate to client devices of a target member account and a second member account, according to embodiments described herein.

FIG. 6 is a flowchart illustrating a method 600 of displaying notifications on a display screen proximate to client devices of a target member account and a second member account, according to embodiments described herein.

At operation 605, the Network Event Engine 206 determines an event relationship exists based in part on a type(s) of member profile attribute present in both member profile data of target member account and the member profile data of the second member account. For example, the Network Event Engine 206 determines that the respective member profile data of both the target member account and the second member account—who have checked into the same event—have the same type of education level attribute, educational institution attribute and/or volunteering interest descriptor.

In various embodiments, the Network Event Engine 206 determines an event relationship based in part on the target member account being a follower on the second member account's social network activity. In other embodiments, the Network Event Engine 206 determines an event relationship based in part on both the target member account and the second member account currently following the social network activity of another member account. In other embodiments, the Network Event Engine 206 determines an event relationship based in part on both the target member account and the second member account currently belonging to a same member group within the social network service. In various embodiments, the Network Event Engine 206 determines an event relationship based in part on a description of a patented invention in the member profile data of target member account being textually similar to a professional interest descriptor present in the member profile data of the second member account.

At operation 610, the Network Event Engine 206 detects a client device associated with the target member account is within a threshold distance to a display screen. For example, a physical stand-alone display screen is present at the event. The event attendee represented by the target member account is wearing a wearable client device such as a first flexible wristband client device—that is activated for use by the target member account solely during the event. The Network Event Engine 206 determines the first flexible wristband client device is within a threshold distance from the physical stand-alone display screen based on real-time GPS data received from the first flexible wristband client device and a pre-defined GPS location of the physical stand-alone display screen.

At operation 615, the Network Event Engine 206 detects a client device associated with the second member account is also within the threshold distance to a display screen. For example, the event attendee represented by the second member account is wearing a second flexible wristband client device that is activated for use by the second member account solely during the event. The Network Event Engine 206 determines the first and second flexible wristband client device are both within the threshold distance from the physical stand-alone display screen within a particular time range. Such threshold distances can be determined based on global positioning system (GPS) data related to the respective flexible wristband client devices. For example, a distance between two flexible wristband client devices is received by Network Event Engine 206 as GPS data. The Network Event Engine 206 compares the distance to the threshold distance in order to determine proximity. If the distance is below the threshold distance, the Network Event Engine 206 determines that proximity currently exists between the two flexible wristband client devices At operation 620, the Network Event Engine 206 causes display of a notification on the display screen. The notification is based in part on an event relationship between the target member account and the second member account. By causing display of the event relationship on the physical stand-alone display screen when the event attendees represented by the target and second member accounts are both near the physical stand-alone display screen during the same time, the event attendees will not be looking down at their respective flexible wristband client devices and will be viewing the same physical display screen. By viewing the same display screen at the same time, a likelihood of personal introduction is increased.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
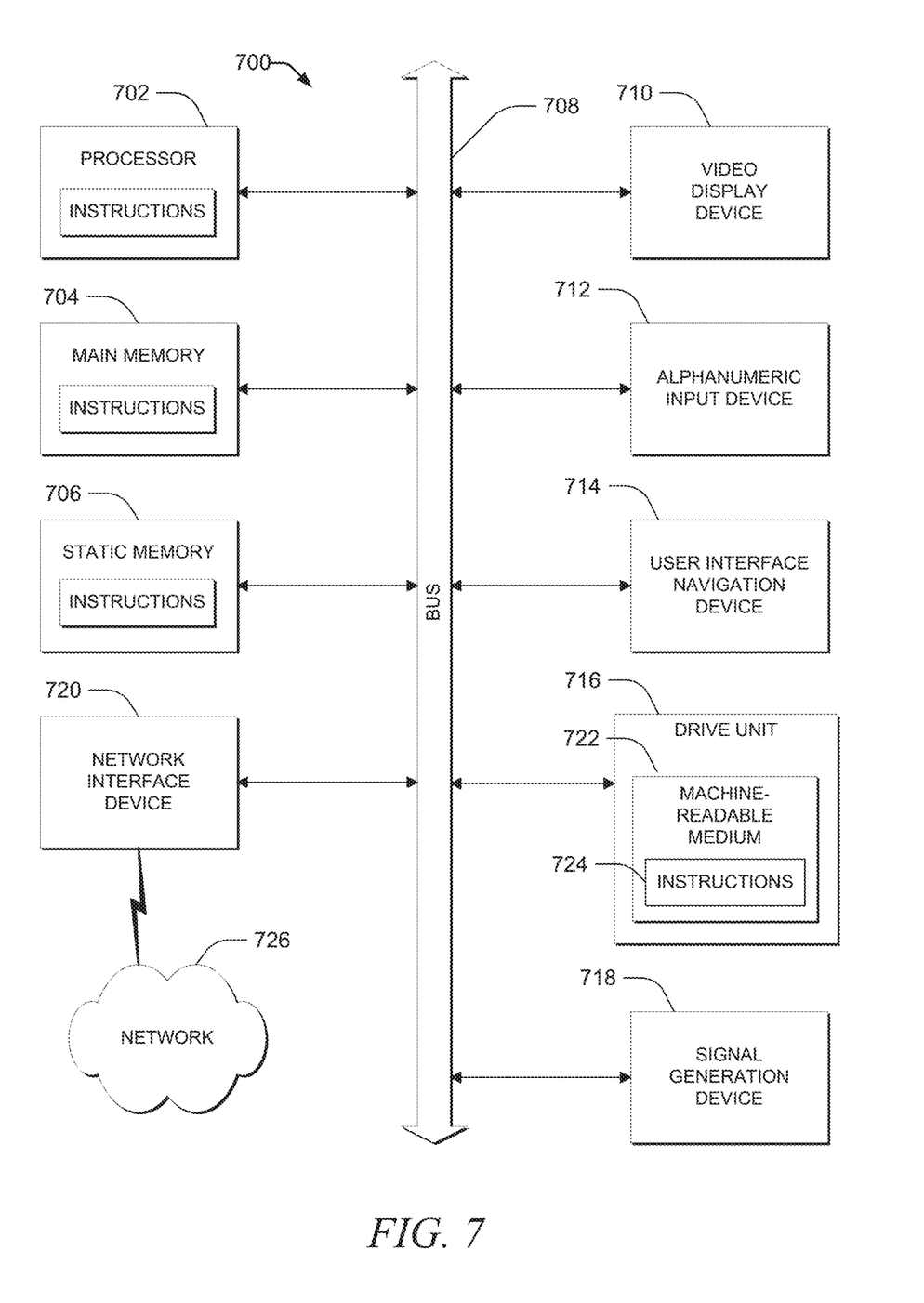
FIG. 7 is a block diagram of an example computer system on which methodologies described herein may be executed, in accordance with some examples of the present disclosure.

FIG. 7 is a block diagram of a machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704, and a static memory 706, which communicate with each other via a bus 708. Computer system 700 may further include a video display device 710 (e.g., a liquid crystal display (LCD) or a cathode ray tube (CRT)). Computer system 700 also includes an alphanumeric input device 712 (e.g., a keyboard), a user interface (UI) navigation device 714 (e.g., a mouse or touch sensitive display), a disk drive unit 716, a signal generation device 718 (e.g., a speaker) and a network interface device 720.

Disk drive unit 716 includes a machine-readable medium 722 on which is stored one or more sets of instructions and data structures (e.g., software) 724 embodying or utilized by any one or more of the methodologies or functions described herein. Instructions 724 may also reside, completely or at least partially, within main memory 704, within static memory 706, and/or within processor 702 during execution thereof by computer system 700, main memory 704 and processor 702 also constituting machine-readable media.

While machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 724 may further be transmitted or received over a communications network 726 using a transmission medium. Instructions 724 may be transmitted using network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed. Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system comprising:
one or more hardware processors; and
a non-transitory machine-readable medium for storing instructions that, when executed by the one or more hardware processors, cause the one or more hardware processors to perform operations comprising:
determining a presence of a first client device associated with a target member account of a social networking service within a threshold distance to a display screen at a physical location during an event time range;
determining a presence of a second client device associated with a second member account of the social networking service within the threshold distance to the display screen at the physical location during the event time range is concurrent with the presence of the first client device associated with the target member account;
determining, based on social network member data, that a relationship between the target member account and the second member account exists in the social networking service, the determining that the relationship exists based on an inferring of an interest in a company by the target member and a receiving of endorsements by the second member from other member accounts of the social networking service employed by the company, the determining that the relationship exists being independent of a determining that a social network connection exists between the target member account and the second member account; and
based on the determining of the presence of the first client device and the determining of the presence of the second client device, and based on the determining that the relationship between the target member account and the second member account exists, causing display of a notification pertaining to the relationship on the display screen, the display screen being separate from the first client device and the second client device.

2. The computer system of claim 1, wherein the determining, based on the social network member data, that a relationship between the target member account and the second member account exists in the social networking service comprises: determining that the relationship exists based in part on at least one type of member profile attribute present in both member profile data of target member account and the member profile data of the second member account, the at least one type of member profile attribute comprises at least one of an education level attribute or an educational institution attribute.

3. The computer system of claim 1, wherein the determining, based on the social network member data, that the relationship between the target member account and the second member account exists in the social networking service comprises:
identifying a member group in the social networking service comprising membership in the member group of the target member account and the second member account; and
determining that the relationship exists based in part on the membership of the target member account and the second member account in the member group.

4. The computer system of claim 1, wherein the determining, based on the social network member data; that the relationship between the target member account and the second member account exists in the social networking service comprises: determining that the relationship exists based in part on a type of volunteering interest descriptor present in both member profile data of target member account and the member profile data of the second member account.

5. The computer system of claim 1, wherein the determining; based on the social network member data, that the relationship between the target member account and the second member account exists in the social networking service comprises: determining that the relationship exists based in part on the target member account having previously selected to follow social network activity of the second member account.

6. The computer system of claim 1, wherein the determining, based on the social network member data, that the relationship between the target member account and the second member account exists in the social networking service comprises: determining that the relationship exists based in part on both the target member account the second member account currently following social network activity of a particular member account.

7. The computer system of claim 1, wherein the relationship is an event relationship between the target member account and the second member account, the event relationship being separate from a social network connection between the target member account and the second member account, the event relationship based on at least one of an education level attribute, an educational institution attribute, or a volunteering interest descriptor associated with the target member account or the second member account.

8. The computer system of claim 1, wherein the relationship is an event relationship between the target member account and the second member account, the event relationship being separate from a social network connection between the target member account and the second member account, the event relationship based on at least one of another member account followed by both the first member account and the second member account, a member group belonged to by both the first member account and the second member account, or similarity between member profile data of member profile data of the target member and a professional interest descriptor present in member profile data of the second member profile.

9. The computer system of claim 1, wherein the determining, based on the social network member data, that the relationship between the target member account and the second member account exists in the social networking service comprises:
  determining that a portion of the target member account's historical browsing behavior in the social networking service corresponds to at least one attribute of a member profile of the second member account in the social networking service; and
  determining that the relationship exists based in part on the target member account's historical browsing behavior.

10. The computer system of claim 9, wherein the determining that the portion of the target member account's historical browsing behavior in the social networking service corresponds to the at least one attribute of the member profile of the second member account in the social networking service comprises:
  identifying a search query submitted within the social networking service by the target member account, the search query including text describing a company that is present as an employer attribute in the member profile data of the second member account; and
  determining that the relationship exists based in part on the search query.

11. The computer system of claim 9, wherein the determining that the portion of the target member account's historical browsing behavior in the social networking service corresponds to the at least one attribute of the member profile of the second member account in the social networking service comprises:
  identifying an access by the target account member of a job posting in the social networking service;
  comparing a first set of professional skills descriptor tags applied to the job posting to a second set of professional skills description tags, the second set of professional skills description tags selected by the target member account for inclusion in member profile data of the target member account;
  identifying a skills gap comprising at least one professional skills descriptor tag from the first set of professional skills descriptor tags not present in the second set of professional skills descriptor tags;
  determining that the second member account selected a respective professional skills descriptor tag in the skills gap for inclusion in the member profile data of the second member account;
  performing the determining that the social network connection exists between the target member account and the second member account; and
  determining that the relationship exists based in part on the respective professional skills descriptor tag in the member profile data of the second member account and the social network connection between the target member account and the second member account.

12. The computer system of claim 11, wherein the determining that the second member account selected the respective professional skills descriptor tag in the skills gap for inclusion in the member profile data of the second member account comprises: determining that the respective professional skills descriptor tag in the member profile data of the second member account has received a plurality of member account endorsements that satisfies a threshold number of endorsements.

13. A non-transitory computer-readable medium storing executable instructions that, when executed by one or more hardware processors, cause the one or more hardware processors to perform operations including:
  determining a presence of a first client device associated with a target member account of a social networking service within a threshold distance to a display screen at a physical location during an event time range;
  determining a presence of a second client device associated with a second member account of the social networking service within the threshold distance to a display screen at the physical location during the event time range is concurrent with the presence of the first client device associated with the target member account;
  determining, based on social network member data, that a relationship between the target member account and the second member account exists in the social networking service, the determining that the relationship exists based on an inferring of an interest in a company by the target member and a receiving of endorsements by the second member from other member accounts of the social networking service employed by the company, the determining that the relationship exists being independent of a determining that a social network connection exists between the target member account and the second member account; and
  based on the determining of the presence of the first client device and the determining of the presence of the second client device, and based on the determining that the relationship between the target member account and the second member account exists, causing display of a notification pertaining to the relationship on the display screen, the display screen being separate from the first client device and the second client device.

14. The non-transitory computer-readable medium of claim 13, wherein the determining, based on the social network member data, that the relationship between the target member account and the second member account exists in the social networking service comprises: determining that the relationship exists based in part on at least one type of member profile attribute present in both member profile data of target member account and the member profile data of the second member account, the at least one type of member profile attribute comprises at least one of: an education level attribute, an educational institution attribute.

15. The non-transitory computer-readable medium of claim 13, wherein the determining, based on the social network member data, that the relationship between the target member account and the second member account exists in the social networking service comprises:
  identifying a member group in the social networking service comprising membership in the member group of the target member account and the second member account; and determining that the relationship exists based in part on the membership of the target member account and the second member account in the member group.

16. The non-transitory computer-readable medium of claim 13, wherein the determining, based on the social network member data, that the relationship between the target member account and the second member account exists in the social networking service comprises:
determining that a portion of the target member account's historical browsing behavior in the social networking service corresponds to at least one attribute of a member profile of the second member account in the social networking service; and
determining that the relationship exists based in part on the target member account's historical browsing behavior.

17. The non-transitory computer-readable medium of claim 16, wherein the determining that the portion of the target member account's historical browsing behavior in the social networking service corresponds to at least one attribute of a member profile of the second member account in the social networking service comprises:
identifying a search query submitted within the social networking service by the target member account, the search query including text describing a company that is present as an employer attribute in the member profile data of the second member account; and
determining that the relationship exists based in part on the search query.

18. The non-transitory computer-readable medium of claim 16, wherein the determining that the portion of the target member account's historical browsing behavior in the social networking service corresponds to at least one attribute of a member profile of the second member account in the social networking service comprises:
identifying an access by the target account member of a job posting in the social networking service;
comparing a first set of professional skills descriptor tags applied to the job posting to a second set of professional skills description tags, the second set of professional skills description tags selected by the target member account for inclusion in member profile data of the target member account;
identifying a skills gap comprising at least one professional skills descriptor tag from the first set of professional skills descriptor tags not present in the second set of professional skills descriptor tags;
determining that the second member account selected a respective professional skills descriptor tag in the skills gap for inclusion in the member profile data of the second member account;
determining that a social network connection exists between the target member account and the second member account; and
determining that the relationship exists based in part on the respective professional skills descriptor tag in the member profile data of the second member account and the social network connection between the target member account and the second member account.

19. The non-transitory computer-readable medium of claim 18, wherein the determining that the second member account selected a respective professional skills descriptor tag in the skills gap for inclusion in the member profile data of the second member account comprises: determining that the respective professional skills descriptor tag in the member profile data of the second member account has received a plurality of member account endorsements that satisfies a threshold number of endorsements.

20. A computer-implemented method, comprising:
determining, using one or more hardware processors, a presence of a first client device associated with a target member account of a social networking service within a threshold distance to a display screen at a physical location during an event time range;
determining a presence of a second client device associated with a second member account of the social networking service within the threshold distance to the display screen at the physical location during the event time range is concurrent with the presence of the first client device associated with the target member account;
determining, based on social network member data, that a relationship between the target member account and the second member account exists in the social networking service, the determining that the relationship exists based on an inferring of an interest in a company by the target member and a receiving of endorsements by the second member from other member accounts of the social networking service employed by the company, the determining that the relationship exists being independent of a determining that a social network connection exists between the target member account and the second member account; and
based on the determining of the presence of the first client device and the determining of the presence of the second client device, and based on the determining that the relationship between the target member account and the second member account exists, causing display of a notification pertaining to the relationship on the display screen, the display screen being separate from the first client device and the second client device.

* * * * *

UNITED STATES PATENT AND TRADEMARK OFFICE
CERTIFICATE OF CORRECTION

PATENT NO.         : 11,025,736 B2                                                     Page 1 of 1
APPLICATION NO.    : 15/380746
DATED              : June 1, 2021
INVENTOR(S)        : Balasubramaniam et al.

It is certified that error appears in the above-identified patent and that said Letters Patent is hereby corrected as shown below:

In the Claims

In Column 18, Line 35, in Claim 4, delete "data;" and insert --data,-- therefor

In Column 18, Lines 43-44, in Claim 5, delete "determining;" and insert --determining,-- therefor Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*